(12) United States Patent
Ebrahim et al.

(10) Patent No.: US 12,373,662 B2
(45) Date of Patent: Jul. 29, 2025

(54) PLASTIC ARTICLE WITH INTEGRATED BARCODE SCANNABLE TO DISPLAY MATERIAL TRACING INFORMATION

(71) Applicant: Lucid Corp., Brampton (CA)

(72) Inventors: Salman Ebrahim, Brampton (CA); Edmund Shee Tong Chin, Brampton (CA); Jaskaran Singh Sukhija, Brampton (CA); Shengli Wang, Brampton (CA)

(73) Assignee: Lucid Corp., Brampton (CA)

( * ) Notice: Subject to any disclaimer, the term of this patent is extended or adjusted under 35 U.S.C. 154(b) by 0 days.

(21) Appl. No.: 18/980,817

(22) Filed: Dec. 13, 2024

(65) Prior Publication Data

US 2025/0131228 A1    Apr. 24, 2025

Related U.S. Application Data (63) Continuation of application No. PCT/CA2023/051457, filed on Nov. 1, 2023.

(60) Provisional application No. 63/421,700, filed on Nov. 2, 2022.

(51) Int. Cl.
*G06K 19/06* (2006.01)
*B65B 61/02* (2006.01)

(52) U.S. Cl.
CPC ...... *G06K 19/06121* (2013.01); *B65B 61/025* (2013.01); *G06K 19/06037* (2013.01)

(58) Field of Classification Search
CPC ....... G06K 19/06121; G06K 19/06037; G06K 19/00; G06K 7/1417; B65B 61/025

USPC ................. 235/494, 487, 462.09, 462.1, 454
See application file for complete search history.

(56) References Cited

U.S. PATENT DOCUMENTS

| 8,579,204 B2 | 11/2013 | Scharfenort et al. |
| 2014/0044994 A1 | 2/2014 | Scharfenort et al. |
| 2015/0164109 A1 | 6/2015 | Ruben |
| 2017/0024692 A1* | 1/2017 | Sambrailo .......... G06Q 10/0833 |
| 2017/0349343 A1* | 12/2017 | Wu ........................ B65D 51/20 |

(Continued)

FOREIGN PATENT DOCUMENTS

| DE | 102019127827 A1 | 8/2020 |
| EP | 1001404 A2 | 5/2000 |

(Continued)

*Primary Examiner* — Edwyn Labaze
(74) *Attorney, Agent, or Firm* — SMART & BIGGAR LP; James Raakman; Justin Philpott (57) ABSTRACT

A system for marking a plastic article with a computer readable matrix barcode associated with input material used to form the plastic article is provided. The system includes a barcode applicator positioned downstream of an article forming operation. The barcode applicator is configured to provide a computer-readable matrix barcode on a surface of the plastic article. The system further includes a controller communicatively coupled to the barcode applicator. The controller has one or more processors configured to collectively: receive tracing information for one or more ingredients of the input material used to form the plastic article; generate the computer-readable matrix barcode scannable to display the received tracing information for each ingredient; and transmit, to the barcode applicator, one or more commands instructing the barcode applicator to provide the generated computer-readable matrix barcode on the surface of the plastic article.

15 Claims, 6 Drawing Sheets

(56) References Cited

U.S. PATENT DOCUMENTS

| | | | |
|---|---|---|---|
| 2019/0197278 A1 | 6/2019 | Kastury et al. | |
| 2019/0306385 A1* | 10/2019 | Sharma | B42D 25/333 |
| 2019/0354992 A1 | 11/2019 | Duckett et al. | |
| 2021/0182801 A1* | 6/2021 | O'Brien | H04L 9/3239 |

FOREIGN PATENT DOCUMENTS

| | | | |
|---|---|---|---|
| GB | 2572233 A | 9/2019 | |
| JP | 2002293332 A | 10/2002 | |
| JP | 2009234656 A | 10/2009 | |
| WO | 2015065161 A3 | 6/2015 | |

* cited by examiner

PLASTIC ARTICLE WITH INTEGRATED BARCODE SCANNABLE TO DISPLAY MATERIAL TRACING INFORMATION

CROSS-REFERENCE TO RELATED APPLICATIONS

This application is a continuation of International Application No. PCT/CA2023/051457, filed Nov. 1, 2023, which claims the benefit of U.S. Provisional Patent Application No. 63/421,700 filed Nov. 2, 2022, the entirety of each of which is incorporated herein by reference.

FIELD

The teaching disclosed herein relates generally to plastic articles and the manufacture thereof. In particular, the teaching disclosed herein relates to a plastic article having an integrated barcode that is scannable to display tracing information associated with input material used to form the plastic article.

INTRODUCTION

U.S. Pat. No. 8,579,204B2 (Scharfenort et al.) discloses a method for visualization of non-visible information on a packaging material to provide traceability. The method comprises the steps of reading the non-visible information from the packaging material by means of a magnetic head reader, processing the non-visible information in a central processing unit together with additional new non-visible information, and printing an optional portion of the amount of combined non-visible information onto the packaging material as a traceability marking. The invention also relates to a device for carrying out the method and a packaging line with a filling machine making use of the device.

JP2009234656A (Yuse et al.) discloses food containers equipped with identification codes and a method of forming the identification codes of the food containers capable of quickly and easily obtaining the information that can be changed in the individual container unit even when they are the same goods or products. The outer surface of the container of packaged food displays (A) a two-dimensional code displaying the information of a URL of an Internet site for checking the information about the packaged food, (B) characters, symbols, or a character display consisting of a combination thereof used for accessing individual information in the individual container unit of the packaged food on the Internet site, and (C) a year, month, and day display of at least any one of a manufacturing date, an expiration date, a freshness date of the packaged food.

US20190354992A1 (Duckett et al.) discloses a method of remotely updating information related to a food product item. The method is comprised of configuring an application that can receive nutritional, allergen, dating or other important information specific to the food product. The information may be updatable either automatically or manually. The data is input into the application and linked to a remote database via a key identifier. The food product is then tagged or labeled so that a user may access the most current updated information. The method of the present invention may be used in conjunction with an intelligent printer, such as a RFID, QR code, or barcode printer, a smart device, or a personal computer.

JP2002293332A (Ichikawa) discloses a food packaging container which can convey information concerning foods to individual consumers, brokers or the like correctly and rapidly so that various data processing can be easily performed based on the information. Information concerning foods such as nutritive element information of foods is recorded on the food packaging container in the form of two-dimensional code.

SUMMARY

The following summary is intended to introduce the reader to various aspects of the applicant's teaching, but not to define any invention.

In one aspect, a method of manufacturing a plastic article is disclosed. The method includes obtaining input material suitable for manufacturing the plastic article and for which tracing information is known; forming the plastic article from the input material; generating a computer-readable matrix barcode scannable to display the tracing information; associating the computer-readable matrix barcode with a web landing page that displays the tracing information; and providing the computer-readable matrix barcode on a surface of the plastic article.

In some examples, the input material comprises a first ingredient and at least a second ingredient, and the tracing information comprises first tracing information for the first ingredient and second tracing information for the second ingredient.

In some examples, said obtaining the input material comprises setting a relative proportion among at least the first and second ingredients.

In some examples, at least one of the first and second ingredients is a recycled ingredient.

In some examples, said forming the plastic article comprises thermoforming the plastic article.

In some examples, the method further includes, before said thermoforming the plastic article, extruding a plastic sheet made from the input material.

In some examples, said forming the plastic article comprises one of injection molding, vacuum forming, and blow molding the plastic article.

In some examples, the computer-readable matrix barcode is a quick response (QR) code.

In some examples, said providing the computer-readable matrix barcode comprises using a laser to etch the computer-readable matrix barcode on the surface of the plastic article.

In some examples, the input material comprises one of polyethylene terephthalate, polypropylene and polystyrene.

In some examples, the method further includes generating a revised computer-readable matrix barcode in response to a change in the input material.

In some examples, the change in the input material comprises at least one of a composition change, a source change, and a proportion change for at least one ingredient of the input material.

In some examples, the method further includes, after said providing the computer-readable matrix barcode on the surface of the plastic article, stacking the plastic article onto the particle article manufactured immediately before.

In some examples, said forming the plastic article occurs after said generating the computer-readable matrix barcode.

In some examples, said providing the computer-readable matrix barcode on the surface of the plastic article takes place within 1 minute of completion of said forming the plastic article.

In some examples, said generating the computer-readable matrix barcode comprises encoding a uniform resource locator (URL) for the web landing page into the matrix barcode.

In another aspect, a system for marking a plastic article with a computer-readable matrix barcode associated with input material used to form the plastic article is disclosed. The system includes a barcode applicator positioned downstream of an article forming operation. The barcode applicator is configured to provide a computer-readable matrix barcode on a surface of the plastic article. The system further includes an electronic control device communicatively coupled to the barcode applicator. The electronic control device has one or more computer processors configured to collectively: receive tracing information for one or more ingredients of the input material used to form the plastic article; generate the computer-readable matrix barcode scannable to display the received tracing information for each ingredient; and transmit, to the barcode applicator, one or more commands instructing the barcode applicator to provide the generated computer-readable matrix barcode on the surface of the plastic article.

In some examples, to generate the computer-readable matrix barcode, the one or more computer processors are configured to collectively encode a URL associated with the tracing information in the computer-readable matrix barcode.

In some examples, the one of more computer processors are configured to collectively generate a revised computer-readable matrix barcode in response to a change in the input material.

In some examples, the change in the input material comprises at least one of a composition change, a source change, and a proportion change for at least one of the one or more ingredients.

In some examples, the one or more computer processors are configured to collectively receive revised tracing information corresponding to the change in the input material.

In some examples, the barcode applicator is positioned upstream of an article stacking operation.

In some examples, the barcode applicator is positioned upstream of an article finishing operation.

In some examples, the barcode applicator is a laser configured to etch the computer-readable matrix barcode on the surface of the plastic article.

In some examples, the computer-readable matrix barcode is a quick response (QR) code.

In another aspect, a plastic article is disclosed. The plastic article includes an article body formed from an input material. The input material comprises one or more ingredients. Tracing information for each ingredient is known. The plastic article further includes a computer-readable matrix barcode provided on a surface of the article body. The computer-readable matrix barcode is associated with the input material and scannable to display the tracing information for each ingredient.

In some examples, the input material is a transparent plastic.

In some examples, the computer-readable matrix barcode is a quick response (QR) code.

In some examples, the computer-readable matrix barcode is laser etched on the surface of the article body.

In some examples, the computer-readable matrix barcode and the article body are of unitary construction.

Other aspects and features of the teachings disclosed herein will become apparent to those ordinarily skilled in the art, upon review of the following description of the specific examples of the present disclosure.

DRAWINGS

For a better understanding of the described examples and to show more clearly how they may be carried into effect, reference will now be made, by way of example, to the accompanying drawings in which.

The drawings included herewith are for illustrating various examples of apparatuses and methods of the teaching of the present specification and are not intended to limit the scope of what is taught in any way.

DETAILED DESCRIPTION

Various apparatuses or processes will be described below to provide an example of each claimed invention. No example described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an example of any claimed invention. Any invention disclosed in an apparatus or process described below that is not claimed in this document may be the subject matter of another protective instrument, for example, a continuing patent application, and the applicants, inventors, or owners do not intend to abandon, disclaim, or dedicate to the public any such invention by its disclosure in this document.

Figure 1:
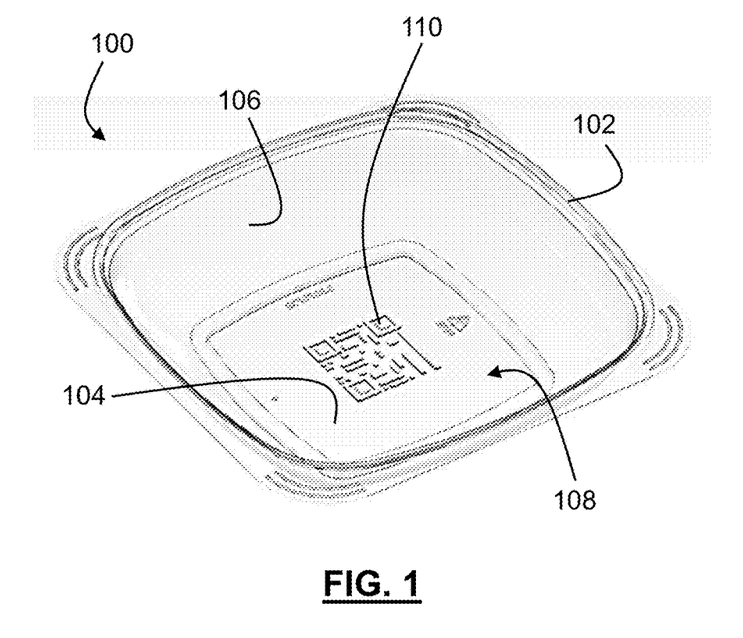
FIG. 1 is a perspective view of a plastic article according to aspects of the teaching disclosed herein.

Referring to FIG. 1, a plastic article 100 in accordance with aspects of the teaching disclosed herein includes a scannable matrix barcode that makes tracing information for the input material used to form the plastic article accessible. Many food items and consumer goods are sold in single-use plastic articles, such as, for example, bottles, containers, blister packs, clamshells, etc. In 2022, the Organisation for Economic Co-operation and Development estimated that only 9% of plastic waste is ultimately recycled. The rest of the plastic waste ends up in landfills or littered on land or water. Consumers have taken note of the environmental impact of plastic waste and are making purchasing decisions based on sustainability criteria.

As disclosed in more detail subsequently herein, the material tracing information accessed from the scannable matrix barcode can be used to inform the buying decision of a prospective purchaser. For example, a prospective purchaser may prefer to buy a food item or consumer good packaged in a plastic article 100 for which tracing information of the input material used to form that plastic article 100 is accessible (compared to a food item or consumer good packaged in a plastic article for which such tracing information is not provided). Alternatively, in cases where a prospective purchaser is deciding among multiple food items or consumer goods packaged in different plastic articles 100 for which tracing information of the input material used to form the respective plastic article is available, the purchaser can choose the food item or consumer good packaged in the plastic article 100 with the tracing information they prefer.

The plastic article 100 includes an article body 102 formed from an input material. The input material comprises one or more ingredients. Tracing information for at least one ingredient is known. In some examples, tracing information for each ingredient is known.

In the illustrated example, the article body 102 includes a base wall 104 and a sidewall 106 extending upward and laterally outward from a perimeter of the base wall 104. The sidewall 106 and the base wall 104 enclose, laterally and from below, an interior space 108 for holding one or more items, such as, for example, food items or consumer goods. Optionally, the article body 102 may include a removable lid to enclose the interior space 108 from above. The size and shape of the plastic article 100 can be selected to meet the requirements of the packager. In the illustrated example, the plastic article 100 is a generally square container. In some examples, the plastic article 100 may be shaped as a tray, clamshell, blister pack, pouch, or any other configuration suited to holding the item(s) to be packaged.

The plastic article 100 further includes a computer-readable matrix barcode 110 provided on any available surface of the article body 102. The computer-readable matrix barcode 110 is associated with the input material and scannable to display the tracing information for at least one ingredient of the input material. In examples where tracing information for each ingredient is known, the matrix barcode 110 is scannable to display the tracing information for each ingredient.

Tracing information for each ingredient includes at least one of an ingredient composition, an ingredient source, and an ingredient quantity. For example, the ingredient composition may be polyethylene terephthalate (PET), polypropylene, polystyrene, or polyethylene. For example, the ingredient source may be virgin resin, post-industrial re-grind, post-consumer re-grind, or recovered ocean plastic. The ingredient source may further specify a location from where that ingredient was sourced (e.g., ocean plastic recovered from Pasig River in Manila, Philippines, food grade re-grind from recycling facility in Guelph, Ontario, etc.). For example, the ingredient quantity may be a volume or mass of that ingredient in the input material. Alternatively, or in addition, the ingredient quantity may be a proportion of that ingredient relative to other ingredients in the input material.

In the illustrated example, the matrix barcode 110 is provided on an exterior surface of the base wall 104. The matrix barcode 110, in the illustrated example, can be scanned from below the plastic article 100 (as viewed in FIG. 1). For example, a user may orient the plastic article 100 so that the matrix barcode 110 is scannable by the camera lens of the user's smartphone or tablet. Providing the matrix barcode 110 on an external surface of the article body 102 may facilitate user access. However, in some examples, the matrix barcode 110 is provided on an inside surface of the article body 102.

The matrix barcode 110 can have any format in which data is encoded by a machine-readable arrangement of visual elements, such as, for example, Data Matrix, Maxi-Code, Vericode, PDF417, Aztech Code. In the illustrated example, the matrix barcode 110 is a quick response (QR) code. Data is encoded in a QR code through the arrangement of squares. Upon scanning by an optical scanning device, the encoded data translates back to its original form. In some examples, the matrix barcode 110 holds (e.g., encodes) a uniform resource locator (URL) associated with a web landing page.

In some examples, the matrix barcode 110 and the article body 102 are of unitary construction. In the illustrated example, the matrix barcode 110 is laser etched on the base wall 104 of the article body 102. This prevents the matrix barcode 110 from being removed from the plastic article 100. In the illustrated embodiment, the input material used to form the plastic article 100 is a transparent plastic (e.g., PET). The laser-etched matrix barcode 110, in the illustrated example, does not contain any black or white colour. The laser can etch the matrix barcode 110 on the surface of the article body 102 with contrast differences between the various elements in the matrix barcode 110 sufficient for an optical scanning device to detect.

In some examples, the matrix barcode 110 is provided on the article body 102 at the time of manufacturing the plastic article 100 and associated with the input material used to form the plastic article 100. Within a manufacturing facility, batches of different plastic articles 100 are manufactured in sequence, with each new batch of plastic articles 100 potentially having a different input material. For example, one manufacturing facility may manufacture 50,000 salad containers made from 50% virgin PET and 50% recycled PET, then manufacture 70,000 meat trays made from 75% virgin PET and 25% recycled PET. Providing the matrix barcode 110 on the plastic article 100 at the time of manufacturing and associating it with input material used to form that plastic article 100 improves efficiency and precision compared to providing the matrix barcode 110 on the plastic article 100 after manufacturing is completed. After manufacturing the plastic articles will be stacked, making the application of the matrix barcode time consuming because the articles will have to be unstacked and then restacked after application of the matrix barcode. Alternatively or in addition, it may be difficult to determine or recall which input material was used to form the plastic articles after manufacturing).

In some examples, the matrix barcode 110 is printed onto a paper or plastic sticker that is affixed to the article body 102. An advantage of the laser-etched matrix barcode 110 compared to affixing a printed matrix barcode by paper or plastic label is that no additional material is added to the plastic article 100. The affixed labels may also complicate recycling of the plastic article 100. Alternatively, or in addition, no inks are needed with the laser-etched matrix barcode 110. Inks used to print the matrix barcode 110 may be harmful to the environment. An advantage of affixing a printed matrix barcode by paper or plastic label compared with the laser-etched matrix barcode 110 is simplified manufacturing.

In use, a prospective customer can scan the matrix barcode 110 on the plastic article 100 with an optical scanning device. The optical scanning device in many cases will be the integrated camera of the customer's smartphone. However, in some cases it may be the integrated camera of the customer's tablet computer or a barcode reader.

In the example illustrated, when the matrix barcode 110 is read by a smartphone's camera, an application or program on the smartphone deciphers the matrix barcode 110, and the deciphered data triggers an action. When the matrix barcode 110 holds a URL, that action may be for the smartphone to automatically navigate to the web landing page associated with that URL using the smartphone's default internet browser. In some examples, the action may be for the smartphone to display a link to the URL. The user may then click the link to be directed to the web landing page associated with the URL.

Figure 7:
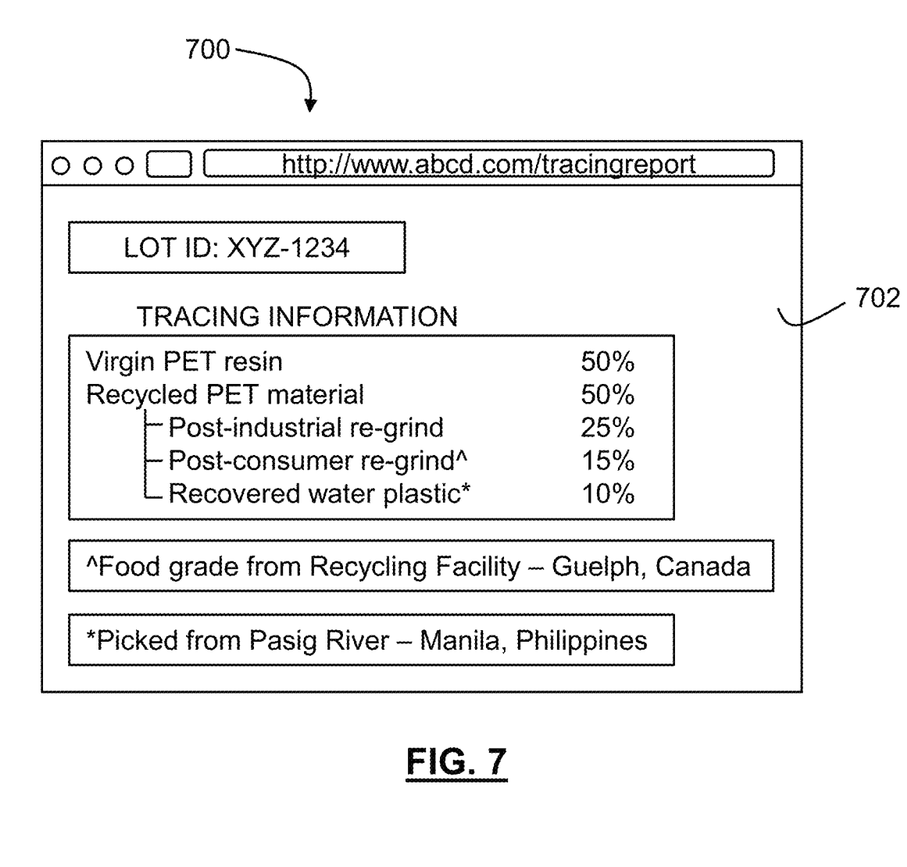
FIG. 7 is a schematic illustration of an example tracing report displayed on a user electronic device screen.

FIG. 7 shows an example landing page 700 displayed on a user electronic device screen 702 (e.g., screen of a smartphone, tablet, etc.). The landing page 700 is tied (e.g., corresponds) to the input material used to form the plastic article 100 through its matrix barcode 110. In the illustrated example, the landing page 700 identifies the input material by LOT ID: XYZ-1234. The landing page 700 associated with a plastic article 100 made from a different input material would display different information (e.g., see FIG. 8 which shows a different LOT ID and different tracing information).

In the illustrated example, the landing page 700 displays tracing information for each ingredient. Each ingredient has an ingredient composition (PET), an ingredient source (virgin, post-consumer re-grind, etc.) and an ingredient quantity. In the illustrated example, the ingredient quantity is a relative proportion (given in percentage form) of that ingredient to the other ingredients of the input material. In some examples, the ingredient quantity is a mass of that ingredient.

According to the landing page 700, the associated plastic article 100 is made from 50% virgin PET and 50% recycled PET material. The recycled PET comprises part post-industrial regrind, part post-consumer re-grind and part recovered water plastic. The landing page 700, in the illustrated example, further displays additional ingredient source information for some of the recycled PET material. The post-consumer re-grind is from a recycling facility in Guelph, Canada and food grade. The recovered water plastic was picked from the Pasig River in Manila, Philippines.

Based on the tracing information displayed, the prospective purchaser can determine whether they wish to buy the item(s) held in that plastic article 100. In some cases, a prospective purchaser may prefer to buy items held in a plastic article made from at least a certain percentage of recycled ingredients. In some cases, a prospective purchaser may compare the tracing information of different plastic articles 100 to determine which item to buy. In some cases, a prospective purchaser may simply want to purchase an item held in a plastic article 100 for which tracing information is available.

In some examples, the landing page 700 may display additional tracing information related to the input material. Some or all of the tracing information may be transformed into sustainability statistics more easily understood by a lay person. As an example, the landing page 700 may display the number of bottles diverted from landfills (calculated by dividing the total amount of post-consumer and post-industrial re-grind in the input material of LOT ID: XYZ-1234 by the average amount of PET in a 500 ml bottle). As another example, the landing page 700 may display a volume of greenhouse gases saved from using recycled material (calculated by dividing the amount of recycled material in the input material of LOT ID: XYZ-1234 by the average volume of greenhouse gas emitted to make an equivalent amount of virgin PET).

Figure 8:
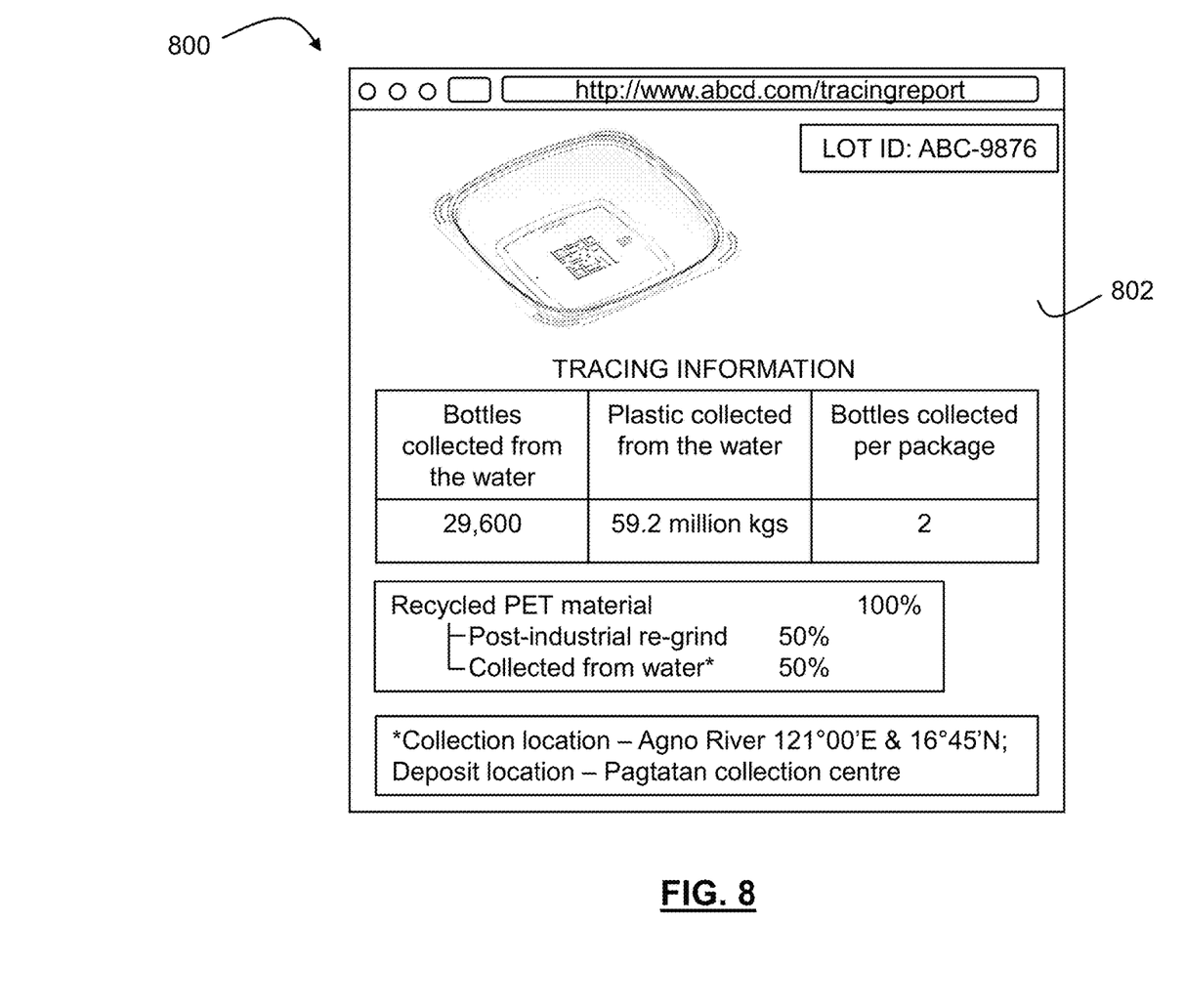
FIG. 8 is a schematic illustration of another example tracing report displayed on a user electric device screen.

FIG. 8 shows another example landing page 800 displayed on a user electronic device screen 802. Like the landing page 700, the landing page 800 corresponds to the input material used to form the plastic article 100 through its matrix barcode 110. In the illustrated example, the landing page 800 identifies the input material by LOT ID: ABC-9876 and includes an image of the associated plastic article 100. In some examples, the landing page 800 does not display the LOT ID and/or the image of the plastic article 100.

In the illustrated example, the landing page 800 displays tracing information for each ingredient. Each ingredient has an ingredient composition (PET), an ingredient source (post-industrial re-grind and recovered ocean plastic) and a relative proportion of that ingredient to other ingredients. According to the landing page 800, the associated plastic article 100 is made from 100% recycled PET (50% post-industrial re-grind and 50% recovered ocean plastic). The landing page 700, in the illustrated example, further displays additional ingredient source information for some of the recycled PET material. In this example, the recovered ocean plastic was collected from the Agno River at 121°00'E and 16°45'N and was deposited at the Pagtatan Collection Centre.

In the illustrated example, the landing page 800 displays additional tracing information related to the input material. The landing page 800 displays that 59.2 million kilograms of plastic were collected from the water (calculated based on the amount of PET collected from the water that is used in the input material of LOT ID: ABC-9876). The landing page 800 also displays that 29,600 bottles were collected from the water (calculated by dividing the total amount of PET collected from the water that is used in the input material of LOT ID: ABC-9876 by the average amount of PET in a 500 ml bottle). The landing page 800 also displays that the input material used to make the associated plastic article 100 includes an equivalent of 2 bottles collected from the water (calculated by dividing the amount of PET collected from the water that is used in one plastic article 100 by the average amount of PET in a 500 ml bottle).

Figure 2:
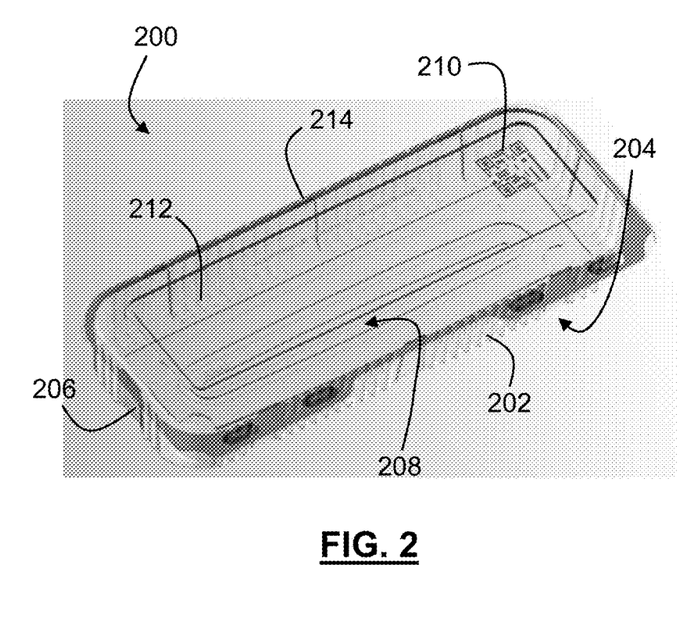
FIG. 2 is a perspective view of another plastic article according to aspects of the teaching disclosed herein.

Referring to FIG. 2, another example of a plastic article 200 according to aspects of the present teaching is similar to the plastic article 100, with like features identified by like reference characters, incremented by 100.

The plastic article 200 includes an article body 202 and a computer-readable matrix barcode 210. In the illustrated example, the article body 202 includes a base wall 204 and a sidewall 206 extending about and upward from a perimeter of the base wall 204. In the example illustrated, the plastic article 200 is a generally rectangular container.

The article body 202, in the illustrated example, includes a lid 212 connected along a first upper edge of the sidewall 206 by a living hinge 214. The lid 212 is, in the example illustrated, formed together with the rest of the article body 202 from the same single sheet of plastic. The sidewall 206, the lid 212, and the base wall 204 enclose, laterally and from above and below, an interior space 208 for holding one or more items, such as, for example, food items or consumer goods. The interior space 208 can be selectively opened and closed by pivoting the lid 212 about the living hinge 214.

In the illustrated example, the matrix barcode 210 is provided on an underside surface of the lid 212. The matrix barcode 210, in the illustrated example, can be scanned from above the plastic article 200 (as viewed in FIG. 2). Providing the matrix barcode 210 on an internal surface of the article body 202 may protect the matrix barcode 210 from the environment and/or impede tampering.

Figure 3:
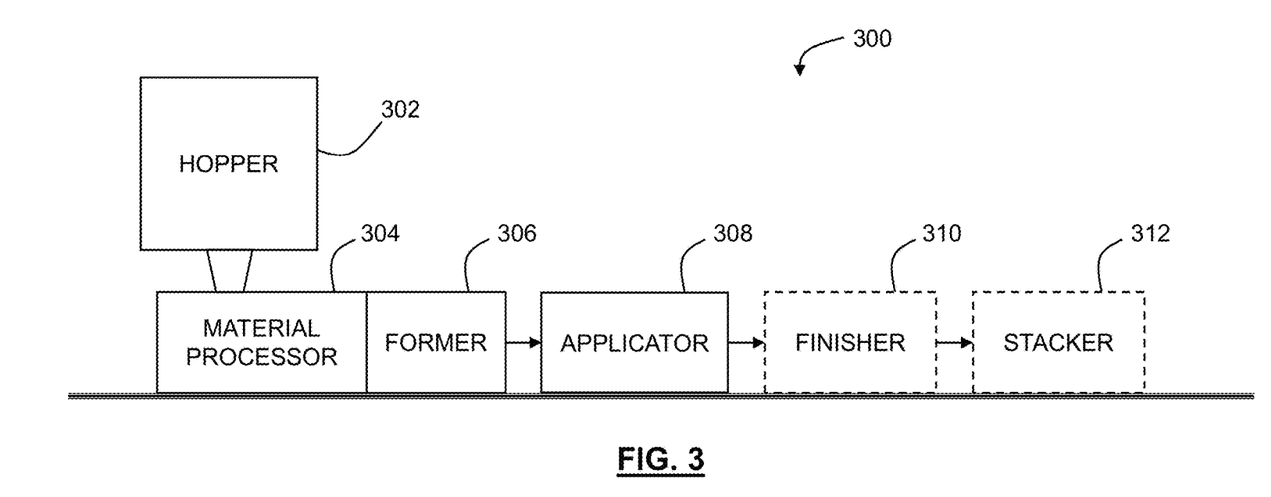
FIG. 3 is a schematic diagram showing a physical arrangement of equipment for manufacture of a plastic article according to aspects of the teaching disclosed herein.

FIG. 3 shows an example manufacturing process 300 that may be used to make the plastic article 100. The input material is held in a hopper 302. The input material is generally held in the hopper 302 in pellet form. The hopper 302 controllably releases the input material into a material processor 304. In general, the material processor 304 is configured to ready the input material for forming.

For example, in an injection molding process, the material processor 304 may include a heated barrel equipped with a reciprocating screw (driven by a hydraulic or electric motor). The heated barrel melts the input material and injects the molten plastic into a clamping unit. For example, in a thermoforming process, the material processor 304 may include an extruder. The extruder extrudes a plastic sheet from the input material which is then fed to a mold.

A former 306 is positioned downstream of the material processor 304. In general, the former 306 is configured to form the input material into a specific predetermined shape. For example, in an injection molding process, the former 306 may include a clamping unit having a mold. For example, in a thermoforming process, the former 306 may include a heated mold with a vacuum to pull the plastic sheet around the mold. The output from the former 306 is a formed plastic article.

In the illustrated example, the former 306 is depicted as a single unit. In other examples, the former 306 includes two or more discrete subunits. For example, a plastic bottle may be injection molded in a first former unit and then blow molded in a second former unit to form the hollow interior of the plastic bottle.

In the illustrated example, the material processor 304 and the former 306 are positioned side-by-side. Such an arrangement may be used in an injection molding process in which a heated barrel equipped with a reciprocating screw (the material processor 304) injects molten plastic into a clamping unit (the former 306). In other examples, the material processor 304 and the former 306 may be spaced apart from each other, or even located in different facilities. Such an arrangement may be used in a thermoforming process in which an extruded plastic sheet is fed into a heated mold (the former 306). The extruder (material processor 304) which produces the extruded plastic sheet can be located anywhere (it does not necessarily need to be located in close proximity to the former 306).

In the illustrated manufacturing process 300, a barcode applicator 308 is located downstream of the former 306. In general, the applicator 308 is configured to provide the matrix barcode on a surface of the formed plastic article. In some examples, the barcode applicator 308 may be a stamper which stamps the matrix barcode 110 on the formed plastic article. In some examples, the barcode applicator 308 may be a labeler which affixes a plastic or paper label to the formed plastic article on which the matrix barcode 110 is printed. In some examples, the barcode applicator 308 is a pad printing machine that attaches the matrix barcode 110 to the plastic article 100. In some examples, the barcode applicator 308 is a laser that etches the matrix barcode 110 on the plastic article 100.

In the illustrated manufacturing process 300, an optional finisher 310 is positioned downstream of the applicator 308. In general, the finisher is configured to finish the formed plastic article. For example, the finisher 310 may be a labeler which affixes a label to the plastic article (the label may contain nutritional information, branding, etc.). For example, in a thermoforming process, the finisher 310 may include a trim press or cutting machine. Due to the nature of thermoforming, the formed plastic part can have excess materials left over from the forming process. Excess materials can be trimmed away with the trim press or cutting machine, cleaning up the edges and removing any unnecessary plastic from the formed plastic article. In an injection molding process, the finisher 310 may include a final assembly unit (e.g., injection molded articles formed with lids/covers may be closed, and/or injection molded articles formed with multiple layers may be assembled together).

In the illustrated manufacturing process 300, an optional stacker 312 is positioned downstream of the applicator 308. The stacker 312 is configured to stack the finished plastic articles 100 and thereby make them easier to store and/or ship.

Figure 4:
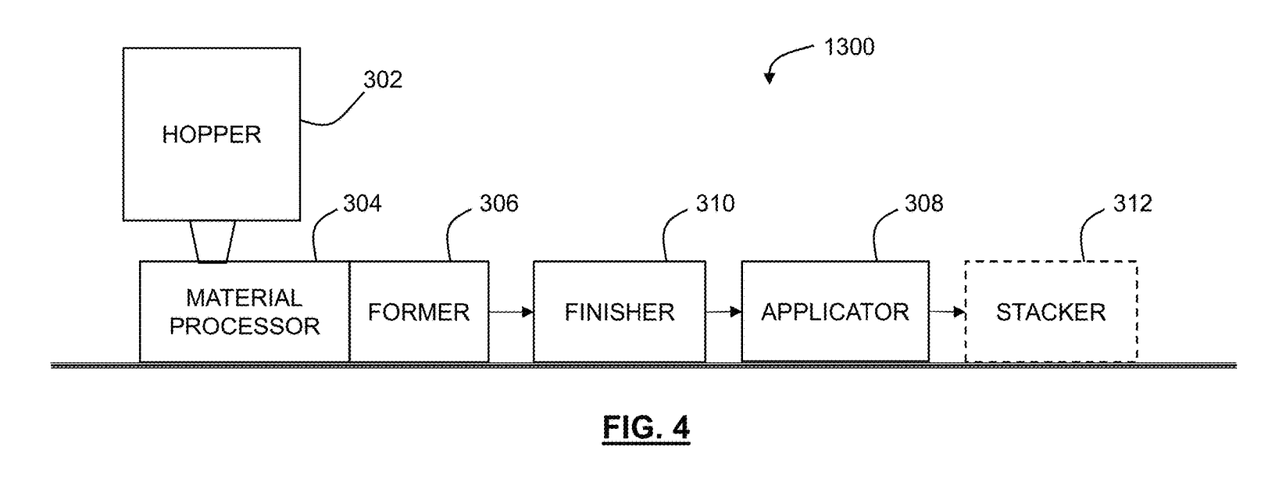
FIG. 4 is a schematic diagram showing another physical arrangement of equipment for manufacture of a plastic article according to aspects of the teaching disclosed herein.

Referring now to FIG. 4, another example manufacturing process 1300 in accordance with aspects of the teaching disclosed herein includes the hopper 302, the material processor 304, the former 306, the applicator 308, the finisher 310, and the stacker 312, but the positions of the applicator 308 and the finisher 310 are interchanged. The applicator 308 is positioned downstream of the finisher 310 and upstream of the optional stacker 312.

Figure 5:
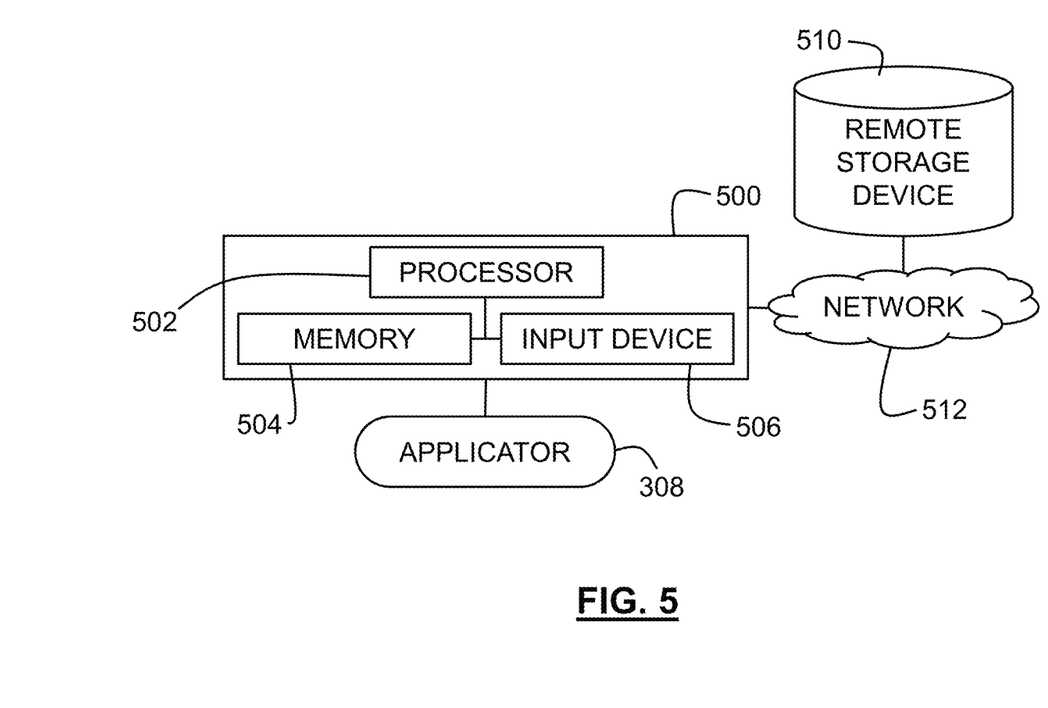
FIG. 5 is a schematic diagram of an electronic controller communicatively coupled to a barcode applicator and a remote storage device.

Reference is made to FIG. 5, which schematically illustrates an example system for marking a plastic article with a computer-readable matrix barcode associated with input material used to form the plastic article. In the illustrated example, the system includes a barcode applicator 308 and an electronic control device 500 communicatively coupled to the barcode applicator 308. The barcode applicator 308 is positioned downstream of an article forming operation (e.g., see FIGS. 3 and 4).

The barcode applicator 308 is configured to provide a computer-readable matrix barcode 110 on a surface of a plastic article 100 (FIG. 1). In some examples, the barcode applicator 308 is positioned upstream of an article stacking operation (e.g., see FIGS. 3 and 4). In some examples, the barcode applicator 308 is positioned upstream of an article finishing operation (e.g., see FIG. 3).

The electronic control device 500 may include a connection with a network 512, such as a wired or wireless connection to the Internet or to a private network. In some cases, the network 512 includes other types of computer or telecommunication networks.

In the illustrated example, the electronic control device 500 includes a computer processor 502, a memory 504, and an input device 506. Each of the memory 504 and the input device 506 are communicatively coupled to the computer processor 502, directly or indirectly. The computer processor 502 may have numerous I/O ports that may be communicatively coupled to one or both the memory 504 and the input device 506, for example.

In some examples, the electronic control device 500 includes multiple of any one or more of the computer processor 502, the memory 504, and the input device 506. In some examples, the electronic control device 500 does not include one or more of the memory 504 and the input device 506. For example, the electronic control device 500 may not include the memory 504, and/or may not include the input device 506.

The memory 504 can include random access memory (RAM), read only memory (ROM), or similar types of memory. Also, in some examples, the memory 504 stores one or more applications for execution by the computer processor 502. Applications correspond with software modules including computer executable instructions to perform processing for the functions and methods described below. In some examples, some or all of the memory 504 may be integrated with the computer processor 502. For example, the computer processor 502 may be a microcontroller (e.g., Microchip™ AVR, Microchip™ PIC, or ARM™ microcontroller) with onboard volatile and/or non-volatile memory.

Generally, the computer processor 502 can execute computer readable instructions (also referred to as applications or programs). The computer readable instructions can be stored in the memory 504, or can be received from remote storage accessible through the network 512, for example. When executed, the computer readable instructions can configure the computer processor 502 (or multiple computer processors 502, collectively) to perform the acts described herein below with reference to method 600 of FIG. 6, for example.

The schematic of FIG. 5 illustrates the connection of the electronic control device 500 to the barcode applicator 308 (FIGS. 3 and 4). The barcode applicator 308 can be communicatively connected to the electronic control device 500 through the wireless network 512 (e.g., wireless access network, Bluetooth®, etc.) and/or through a wired connection (e.g., hardwiring, USB). These connections can allow the electronic control device 500 to communicate and/or relay signals with the barcode applicator 308. The barcode applicator 308 may include a laser, a labeler, a stamper, or a pad printing machine, for example. In examples where the barcode applicator 308 is a laser, the laser is configured to etch the computer-readable matrix barcode 110 on the surface of the plastic article 100 (e.g., see FIG. 1).

The input device 506 can include any device for entering information into the electronic control device 500. The input device 506 can include one or more of a keyboard, keypad, button, barcode reader, switch, cursor-control device, touchscreen, camera, and microphone. The input device 506 can also include input ports and wireless radios (e.g., Bluetooth®, or 802.11x) for making wired and wireless connections to external devices (e.g., for sending control signals, such as user selections, to the computer processor 502 from an external electronic device).

In some examples, the computer processor 502 is configured to:
  i) receive tracing information for one or more ingredients of the input material used to form the plastic article 100;
  ii) generate a computer-readable matrix barcode 110 scannable to display the received tracing information for each ingredient; and
  iii) transmit, to the barcode applicator 308, one or more commands instructing the barcode applicator 308 to provide the generated computer-readable matrix barcode 110 on a surface of the plastic article 100.

To receive the tracing information, the computer processor 502 may be configured to exchange signals with the memory 504 and/or input device 506 (FIG. 5). For example, the input device 506 may be used to input the tracing information into the memory 504 (or in some cases, send the tracing information directly to the computer processor 502).

To generate the matrix barcode 110, the computer processor 502 may be configured to transform data into a machine-readable arrangement of visual elements. In some examples, to generate the matrix barcode 110, the computer processor 502 is configured to encode a URL associated with the tracing information in the computer-readable matrix barcode 110.

The data transformed (e.g., encoded) into the matrix barcode 110 may be a URL for a web landing page (e.g., see landing page 700 of FIG. 7). The URL and landing page are specific (i.e., correspond) to the input material used to form the plastic article 100. In some examples, the computer processor 502 is further configured to create a URL and then generate the matrix barcode 110 with that URL encoded therein. In some examples, the computer processor 502 selects a previously created URL before generating the matrix barcode 110. The previously created URL may be saved in the memory 504.

In some examples, the matrix barcodes 110 and/or the URLs generated by the computer processor 502 are saved in the memory 504. This may provide for convenient retrieval of a previously generated matrix barcode 110 and/or a previously generated URL when needed. In cases where the input material used to form a plastic article is the same as that used to form a previously manufactured plastic article, the computer processor 502 may be configured to retrieve the previously generated matrix barcode 110 and/or URL. The computer processor 502 may be configured to transmit, to the barcode applicator 308, one or more commands instructing the barcode applicator 308 to provide the retrieved computer-readable matrix barcode 110 on the surface of the plastic article 100 (i.e., existing matrix barcodes 110 may be re-used on different plastic articles 100 if the input material is the same).

In some examples, the one or more commands transmitted to the barcode applicator 308 automate the barcode applicator 308 to provide the generated computer-readable matrix barcode 110 on the surface of the plastic article 100. For example, when the barcode applicator 308 includes a laser, the one or more commands may automate the laser to etch the matrix barcode 110 on the surface of the plastic article 100.

In some examples, the electronic control device 500 is a single, unitary device that houses all of its subcomponents (the computer processor 502, the memory 504, etc.). In other examples, the electronic control device 500 is composed of two or more discrete subdevices that are communicatively coupled to each other, that collectively include all of the subcomponents of the electronic control device 500 (the computer processor 502, the memory 504, etc.), and that collectively provide the functionality described herein.

FIG. 5 illustrates one example hardware schematic of an electronic control device 500. In alternative examples, the electronic control device 500 contains fewer, additional or different components. In addition, although aspects of an implementation of the electronic control device 500 are described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM.

The schematic of FIG. 5 illustrates the connection of the electronic control device 500 to an optional remote storage device 510 across the network 512 (e.g., a wired or wireless access network, which may include a private network and/or a public network such as the internet). This connection can allow the electronic control device 500 and the remote storage device 510 to communicate and/or relay signals with each other. The remote storage device 510 may provide additional storage in cases where the memory 504 of the electronic control device 500 provides insufficient storage capacity. As an example, the remote storage device 510 may include cloud storage.

In some examples, the electronic control device 500 stores information in the remote storage device 510, accessible across the network 512. In other examples, the electronic control device 500 stores information distributed across multiple storage devices, such as the memory 504 and the remote storage device 510 (i.e., each of the multiple storage devices stores a portion of the information and collectively the multiple storage devices store all of the information).

Figure 6:
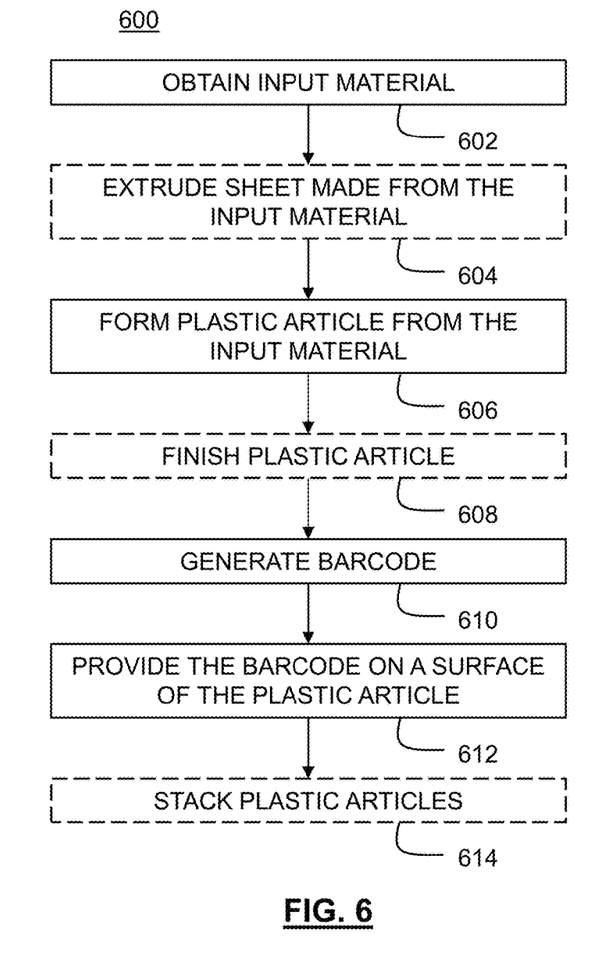
FIG. 6 is a flowchart illustrating a method of manufacturing a plastic container according to aspects of the teaching disclosed herein.

Reference is now made to FIG. 6, which illustrates a method 600 of manufacturing a plastic article in accordance with aspects of the teaching disclosed herein. At step 602, the method involves obtaining input material suitable for manufacturing the plastic article and for which tracing information is known. Step 602 may involve loading the hopper 302 (FIG. 3) with the input material selected to form the plastic article. In some cases, the input material is a blend of two or more ingredients. In some examples, step 602 further involves setting a relative proportion among at least first and second ingredients of the input material. The ingredients of the input material are selected to achieve the necessary performance characteristics of the plastic article being manufactured. In some examples, at least one ingredient of the input material is a recycled ingredient.

At step 606, the method involves forming the plastic article from the input material. Step 606 may involve forming the plastic article with the former (FIG. 3). In some examples, forming the plastic article at step 606 involves thermoforming the plastic article. In some examples, forming the plastic article at step 606 involves one of injection molding, vacuum forming, and blow molding the plastic article.

At step 604, the method may optionally involve extruding a plastic sheet made from the input material before forming the plastic article at step 606. Step 604 may involve extruding the plastic sheet with an extruder (e.g., the material processor 304 shown in FIG. 3). In some examples, step 606 may involve forming the plastic article from the plastic sheet extruded at step 604.

At step 608, the method may optionally involve finishing the plastic article. Step 608 may involve finishing the plastic article with the finisher 310 (FIG. 3). In some examples, step 608 involves trimming away excess materials from the plastic article formed at step 606. This may include cleaning up the edges and/or removing any unnecessary plastic from the formed plastic article.

At step 610, the method involves generating a computer-readable matrix barcode scannable to display the tracing information (e.g., see matrix barcode 110 shown in FIG. 1). The matrix barcode can have any format in which data is encoded by a machine-readable arrangement of visual elements. In some examples, the generated computer-readable matrix barcode is a quick response (QR) code, Data Matrix, MaxiCode, Vericode, PDF417, or Aztech Code. In some examples, generating the computer-readable matrix barcode at step 610 occurs before forming the plastic article at step 606. In some examples, generating the matrix barcode at step 610 involves encoding a uniform resource locator (URL) into the matrix barcode. The URL is associated with the tracing information and may direct one to a web landing page that displays the tracing information (e.g., see landing page 700 of FIG. 7).

At step 612, the method involves providing the computer-readable matrix barcode on a surface of the plastic article. Step 612 may involve using the barcode applicator 308 (FIG. 3) to apply the matrix barcode to the plastic article. Providing the computer-readable matrix barcode at step 612 may take place before or after finishing the plastic article at step 608. In some examples, providing the computer-readable matrix barcode on the surface of the plastic article at step 612 takes place within 10 minutes of completion of the forming the plastic article at step 606. In some examples, providing the computer-readable matrix barcode on the plastic article at step 612 takes place immediately after the forming of the plastic article at step 606 (e.g., within 1 minute). In some examples, step 608 involves using a laser to etch the matrix barcode on the surface of the plastic article. In some examples, step 608 involves using a pad printing machine to print the matrix barcode on the surface of the plastic article.

At step 614, the method may optionally involve stacking the plastic article onto the particle article manufactured immediately before. Stacking the plastic articles at step 614 may make them easier to store and/or ship (i.e., they take up less volume when stacked). Step 614 may involve using the stacker 312 (FIG. 3) to stack the plastic articles. The stacking of each plastic article at 614 takes place after providing the matrix barcode on that plastic article at step 612.

The method 600 may optionally involve generating a revised computer-readable matrix barcode in response to a change in the input material. In some examples, the change in the input material comprises at least one of an ingredient composition change, an ingredient source change, and an ingredient proportion change for at least one ingredient of the input material. The computer processor 502 (FIG. 5) may be configured to generate a revised computer-readable matrix barcode in response to the change in the input material.

The change in the input material may correspond with a change to manufacturing a different plastic article with different material requirements. For example, a batch of 5,000 polypropylene shampoo bottles are completed and a batch of 10,000 polypropylene plates are about to be manufactured. The plates may require a lower proportion of recycled material so the input material may be adjusted prior to manufacturing the plates.

In other cases, the change in input material may be relatively minor (e.g., an increase in the proportion of one ingredient of 5% and a corresponding decrease in the proportion of another ingredient by 5%). As another example, the source of the recovered ocean plastic may be switched to the Ganges River in Calcutta, India from the Pasig River in Manila, Philippines. A revised matrix barcode is generated in response to the source change in the recovered ocean plastic. In some examples, the computer processor 502 may be configured to receive revised tracing information corresponding to the change in the input material.

What has been described above is intended to be illustrative of examples of the teaching disclosed herein, without limiting the scope of patent claims granted herefrom. The scope of such claims should be given the broadest interpretation consistent with the description as a whole.

The invention claimed is:

1. A method of manufacturing a plastic article, the method comprising:
   obtaining input material suitable for manufacturing the plastic article and for which tracing information is known;
   forming the plastic article from the input material;
   generating a computer-readable matrix barcode scannable to display the tracing information;
   associating the computer-readable matrix barcode scannable with a web landing page that displays the tracing information; and
   providing the computer-readable matrix barcode on a surface of the plastic article, wherein the input material comprises a first ingredient and at least a second ingredient, the tracing information comprises first tracing information for the first ingredient and second tracing information for the second ingredient.

2. The method of claim 1, wherein said obtaining the input material comprises setting a relative proportion among at least the first and second ingredients, and wherein preferably at least one of the first and second ingredients is a recycled ingredient.

3. The method of claim 1, wherein said forming the plastic article comprises thermoforming the plastic article, and wherein the method preferably further comprises extruding a plastic sheet made from the input material before said thermoforming the plastic article.

4. The method of claim 1, wherein the computer-readable matrix barcode is a quick response (QR) code.

5. The method of claim 1, wherein said providing the computer-readable matrix barcode comprises using a laser to etch the computer-readable matrix barcode on the surface of the plastic article.

6. The method of claim 1, further comprising generating a revised computer-readable matrix barcode in response to a change in the input material, wherein preferably the change in the input material comprises at least one of a composition change, a source change, and a proportion change for at least one ingredient of the input material.

7. The method of claim 1, further comprising, after said providing the computer-readable matrix barcode on the surface of the plastic article, stacking the plastic article onto another plastic article manufactured by the method immediately prior thereto.

8. The method of claim 1, wherein said forming the plastic article occurs after said generating the computer-readable matrix barcode, and preferably wherein said providing the computer-readable matrix barcode on the surface of the plastic article takes place within 1 minute of completion of said forming the plastic article.

9. The method of claim 1, wherein said generating the computer-readable matrix barcode comprises encoding a uniform resource locator (URL) for the web landing page into the matrix barcode.

10. A system for marking a plastic article with a computer readable matrix barcode associated with input material used to form the plastic article, the system comprising:

a barcode applicator positioned downstream of an article forming operation, the barcode applicator configured to provide a computer-readable matrix barcode on a surface of the plastic article;

an electronic control device communicatively coupled to the barcode applicator, the electronic control device having one or more computer processors configured to collectively:

receive tracing formation for one or more ingredients of the input material used to form the plastic article;

generate the computer-readable matrix barcode scannable to display the received tracing information for each ingredient;

transmit, to the barcode applicator, one or more commands instructing the barcode applicator to provide the generated computer-readable matrix barcode on the surface of the plastic article; and generate a revised computer-readable matrix barcode in response to a change in the input material, and wherein preferably the change in the input material comprises at least one of a composition change, a source change, and a proportion change for at least one of the one or more ingredients.

11. The system of claim 10, wherein to generate the computer-readable matrix barcode, the one or more computer processors are configured to collectively encode, in the computer-readable matrix barcode, a URL associated with a web landing page that displays the tracing information.

12. The system of claim 10, wherein the one or more computer processors are configured to collectively receive revised tracing information corresponding to the change in the input material.

13. The system of claim 10, wherein the barcode applicator is positioned upstream of an article stacking operation.

14. The system of claim 10, wherein the barcode applicator is a laser configured to etch the computer-readable matrix barcode on the surface of the plastic article.

15. The system of claim 10, wherein the computer-readable matrix barcode is a quick response (QR) code.

\* \* \* \* \*

UNITED STATES PATENT AND TRADEMARK OFFICE
CERTIFICATE OF CORRECTION

| | | |
|---|---|---|
| PATENT NO. | : 12,373,662 B2 | Page 1 of 1 |
| APPLICATION NO. | : 18/980817 | |
| DATED | : July 29, 2025 | |
| INVENTOR(S) | : Salman Ebrahim et al. | |

It is certified that error appears in the above-identified patent and that said Letters Patent is hereby corrected as shown below:

In the Claims

Claim 1, Column 14, Line 61-62:
"computer-readable matrix barcode scannable with a web landing"
Should read:
-- computer-readable matrix barcode with a web landing --

Claim 10, Column 16, Line 9:
"receive tracing formation for one or more"
Should read:
-- receive tracing information for one or more --

Signed and Sealed this
Thirtieth Day of September, 2025

John A. Squires
*Director of the United States Patent and Trademark Office*